(12) United States Patent
Santana de Oliveira et al.

(10) Patent No.: US 11,087,025 B2
(45) Date of Patent: Aug. 10, 2021

(54) DIFFERENTIAL PRIVACY PROCESSING OF IOT STREAMING DATA USING GENERATIVE ADVERSARIAL NETWORKS

(71) Applicant: SAP SE, Walldorf (DE)

(72) Inventors: Anderson Santana de Oliveira, Antibes (FR); Lorenzo Frigerio, Nice (FR); Laurent Gomez, Pegomas (FR)

(73) Assignee: SAP SE, Walldorf (DE)

( * ) Notice: Subject to any disclaimer, the term of this patent is extended or adjusted under 35 U.S.C. 154(b) by 375 days.

(21) Appl. No.: 16/215,358

(22) Filed: Dec. 10, 2018

(65) Prior Publication Data

US 2020/0184106 A1    Jun. 11, 2020

(51) Int. Cl.
| | |
|---|---|
| *G06F 21/62* | (2013.01) |
| *H04L 29/06* | (2006.01) |
| *G06N 3/02* | (2006.01) |
| *G06F 9/54* | (2006.01) |
| *H04L 29/08* | (2006.01) |

(52) U.S. Cl.
CPC .......... *G06F 21/6254* (2013.01); *G06F 9/542* (2013.01); *G06F 21/6263* (2013.01); *G06N 3/02* (2013.01); *H04L 65/602* (2013.01); *H04L 65/607* (2013.01); *H04L 67/12* (2013.01)

(58) Field of Classification Search
CPC .................................................. G06F 21/6254
See application file for complete search history.

(56) References Cited

U.S. PATENT DOCUMENTS

| | | | | |
|---|---|---|---|---|
| 2017/0109544 A1* | 4/2017 | Chen | ................... | G06F 21/6254 |
| 2018/0144265 A1* | 5/2018 | Bonawitz | ............... | G06N 5/022 |
| 2019/0013950 A1* | 1/2019 | Becker | .................. | H04L 9/3093 |

* cited by examiner

*Primary Examiner* — Simon P Kanaan (57) ABSTRACT

Streaming data is received that is derived from at least one sensor (e.g., IoT sensors, etc.). At least one differential privacy algorithm is subsequently used to anonymize the received streaming data. The modified streaming data can then be provided (e.g., made available, stored, transmitted over a network, etc.) to at least one consuming computing device. Related apparatus, systems, techniques and articles are also described.

20 Claims, 9 Drawing Sheets

DIFFERENTIAL PRIVACY PROCESSING OF IOT STREAMING DATA USING GENERATIVE ADVERSARIAL NETWORKS

TECHNICAL FIELD

The subject matter described herein relates to the differential privacy processing of Internet of Things (IoT) and other streaming data using generative adversarial networks.

BACKGROUND

The Internet of Things (IoT) is enabling a revolution in industry by having lower cost sensors provide information about various conditions and/or processes. These sensors are often used by individuals in their homes and the like which raises privacy concerns. In particular, the information collected by such sensors, without any privacy safeguards, may reveal or otherwise provide relevant information that is protected by law or otherwise undesirable to expose.

SUMMARY

In one aspect, streaming data is received that is derived from at least one sensor (e.g., IoT sensors, etc.). At least one differential privacy algorithm is subsequently used to anonymize the received streaming data. The modified streaming data can then be provided (e.g., made available, stored, transmitted over a network, etc.) to at least one consuming computing device.

The at least one differential privacy algorithm can include a generative adversarial network (dp-GAN).

The at least one differential privacy algorithm can utilize a generator to generate new data samples by mapping random noise into new data instances while capturing an original data distribution. The at least one differential privacy algorithm can utilize a discriminator that attempts to distinguish the generated new data samples from real data samples. The discriminator can further estimate a probability that a particular data sample comes from a training data set rather than the new data samples generated by the generator.

The modified streaming data can characterize events occurring in multiple sensors. In particular, the modified streaming data can obfuscate which of the multiple sensors generates any particular event.

User-generated input can be received (for example by way of a graphical user interface) that specifies a constraint. The constraint is used to define how data can be transferred and shared between data sources without compromising privacy and, at the same time, while limiting data loss.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The subject matter provided herein is directed to maintaining privacy of streaming data derived from sources such as IoT devices. The current subject matter utilizes, for example, differential privacy networks such as deep neural networks obtained by a generative method that produces an anonymized data stream combining events derived from one to multiple sensors (e.g., IoT device, etc.). This arrangement further allows constraints to be defined in such a way that data can be transferred/shared without compromising privacy and, at the same time, limiting data loss.

Differential privacy defines a constraint on the processing of data so that the output of two adjacent databases (i.e., data sources, etc.) is approximately the same. More formally:

A randomized algorithm M gives ($\varepsilon$, $\delta$)-differential privacy if for all databases $X_1$ and $X_2$ differing on at most one element, and all $S \subseteq \text{Range}(M)$, $\Pr[M(X_1) \in S] \leq \exp(\varepsilon) \times \Pr[M(X_2) \in S] + \delta$".

This condition encapsulates the crucial notion of indistinguishability of the results of a database manipulation whether someone participates or not in that database with a confidence parameter c that is referred to as the privacy budget. Note that the smaller is $\varepsilon$, the more private is the output of the mechanism. The values of interest for $\delta$ are less than the inverse of any polynomial in the size of the database.

Any function M that satisfies the differential privacy condition can be used to generate data that guarantees the privacy of the individuals in the database. One interesting property of differential privacy is composability. So, if M and M' are $\varepsilon$ and $\varepsilon'$-differential private respectively, their composition M∘M' is ($\varepsilon+\varepsilon'$)-differentially private. This property allows for the ability to craft a variety of mechanisms and combinations of such mechanisms to achieve differential privacy in innovative ways.

GANs (Generative Adversarial Networks) are a type of generative models. A GAN, given an initial dataset, is able to generate new data coming from the same distribution and is made up of two different networks: a generator and a discriminator. The architecture of the two networks is independent from the definition of GAN. Deep networks can be used such as long short-term memory. The role of the generator is to map random noise into new data similar to the original samples capturing the original data distribution. On the contrary the discriminator tries to distinguish the generated samples from the real ones estimating the probability that a sample comes from the training data rather than the generator. In this way, the generator becomes each time better at generating realistic samples but meanwhile the discriminator becomes each time better to tell apart the original data from the generated ones. As the two networks play against each other the two losses will not converge to a minimum like in a normal training process but this minmax game has its solution in the Nash equilibrium.

The goal of GANs is not replicating exactly the input data but generating new ones coming from the same distribution. This is the power of GANs; indeed, they allow the generation of an infinite number of unseen samples.

The current subject matter provides for the injection of differential privacy inside the training of a deep learning model. This method requires the addition of a random noise to the computed gradients in order to obfuscate the influence that an input data can have on the generated model. The training process can be defined as follows. Initially, a set of input, called lot, is processed by the model and the loss is computed. The array composed of the gradients for each weight is calculated starting from the loss. The gradients are clipped, returning the minimum value between the norm of the gradients and an upper bound defined as a hyperparameter of the model. A noise coming from a normal distribution is added to the clipped gradients with a variance proportional to the upper bound used before. The result is a sanitized version of the gradients in which the influence of the input data is bounded, guaranteeing privacy.

The current subject matter allows for the injection of differential privacy into deep learning to extend generative adversarial networks. Indeed, it is possible to create a generative model able to generate new anonymized data starting from a dataset. In analyzing the architecture of a GAN, it is clear that the generator never violates the privacy of the input data. In fact, it bases its training only on the results of the discriminator. On the contrary, the discriminator trains itself by comparing the output of the generator with the real data; therefore, it requires a differentially private training. The approach used is the one described above; in fact, after having computed the loss, comparing the distribution of the generated data with real one, the random noise is added in order to inject privacy. The process is iterated until the model reaches the desired solution; at this point the generator is able to produce new anonymized data and therefore can be released without concerns about the privacy of the data.

As used herein, differential privacy generative adversarial networks are referred to as dp-GANs. The dp-GANs provided herein are adapted to labelled streaming and time-series data, thus categorizing time windows. Such categorization can help analysts better target which events should be protected by the differential privacy mechanism.

Figure 1:
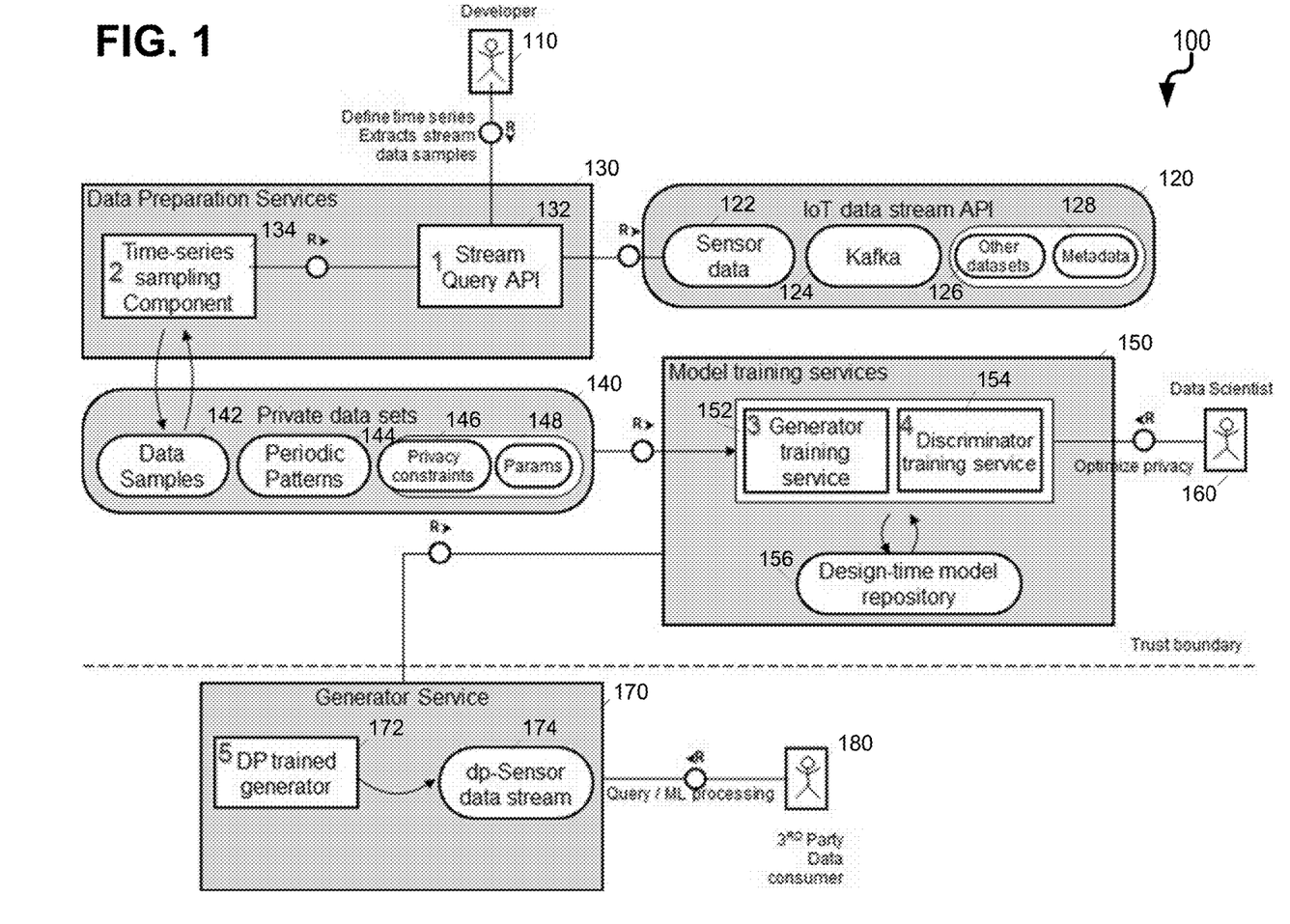
FIG. 1 is a system diagram illustrating a sample architecture for implementing the current subject matter.

FIG. 1 is a system diagram 100 illustrating an example architecture for implementing aspects of the current subject matter. The architecture can be characterized as determining a trust boundary between the data controller (or data owner) and the data consumers (the entities with who the data owner wishes to share the differentially private data).

Initially, data can be obtained directly from the stream sensor real data using an IoT system application programming interface (API) 120. The data can take various forms including sensor data 122 generated directly by a sensor (streaming, time-stamped data, etc.), APACHE KAFKA data 124, as well as other datasets 126 and/or metadata 128 characterizing the streaming data. Data can also be acquired through middleware components supporting IoT data streaming. Further, the system can be configured so as to allow a developer 110 to define queries to create batches from the stream data with the desired periodicity for the anonymization process.

A time series sampling component 134 can receive as input via a stream query API 132 the window periods for the sampled data, using typical time windows. For instance, the sensor data 122 can be captured every second during the period of one day, or yet, hourly for a group of 10 distinct sensors during the period of a month, or yet, other combinations of frequency and duration of the sampling. These time lapses can be used to label the data samples during the data preparation phase by data preparation services 130.

Private data sets 140 can be utilized (i.e., data sets maintained by the user of the current systems) for configuration and training of a differentially private GAN (DP-GAN) as provided herein.

The size of the sample (which may be configured by the developer 110 and/or by a data scientist 160) will influence the precision of the anonymized dataset generated with the current techniques. The data scientist 160 can have the task of optimizing the utility of the generated dataset with respect to the privacy constraints introduced by the differential privacy definition.

For that, the data scientist 160 can use the data samples to train a GAN. First, a new generator model from a design-time model repository 156 can be registered to a generator training service 152 (forming part of model training services 150). The generator training service 152 can then produce outputs starting from random noise without interacting with the real data samples. Next, an associated discriminator can be registered to a discriminator training service 154. With both such registrations, the data scientist 160 can specify if the anonymization process should concern one or multiple sensors, depending on the use case at hand. The model training services 150 can then adjust an objective function for an optimization process across different epochs for the specific generator and discriminator instances.

Once the models are trained, a generator service 170 can, using a differential privacy trained generator 172 create a differential privacy sensor data stream 174 for consumption by a third party 180.

Each different sensor can have an associated generator and discriminator. This arrangement allows for hiding or otherwise obscuring unexpected events that may happen during a day (for instance) concerning a single IoT device. Such an arrangement can capture different signals from an IoT device (e.g. pressure, quantity, temperature, heart rate, etc.) at the same time. Further, different labels can be introduced based on the day of the week, time of the day, or other time period.

In some variations, different sensors can be modeled together. For the needs of a given use case, the data owner can decide to model the behavior of a set of devices or sensors together to add a layer of abstraction and privacy. For instance, in a smart city scenario, modeling sensors together can allow for anonymized data to be disclosed without revealing the location of the sensors and/or to to hide sensitive values for a given unique sensor. Such an arrangement can be beneficial in that it can prevent an attacker from knowing if the measurements from a specific device are part of the dataset.

Given a label, the model is able to generate a sample for that label. A label can be the number/ID of the sensor but also the combination number or day of the week.

Based on the selected options, the model training services 150 can start the training process by training a Long Short-Term Memory, suitable for streaming data, with a stochastic gradient descent for both the specified generator and discriminator. The model training services 150 can add Gaussian noise with fixed variance to the discriminator model. A clipping parameter proportional to the variance can be used. This arrangement will destabilize the original GAN training as to implement a differentially private mechanism.

After a certain number of Epochs, the dp-GAN can converge towards the desired value for ($\varepsilon$, $\delta$)-differential privacy, as determined by the requirements from the data scientist 160. At this point, the data scientist 160 can cause the trained model for the generator to be released to output data to a third party data consumer 180 outside of the trust boundary.

GANs are known for their ability to produce generators that can output data at high speeds, either for models capturing single or multiple devices. This means that there will be no impact whatsoever on performance once the model is trained to generate differentially private data at runtime.

Figure 2:
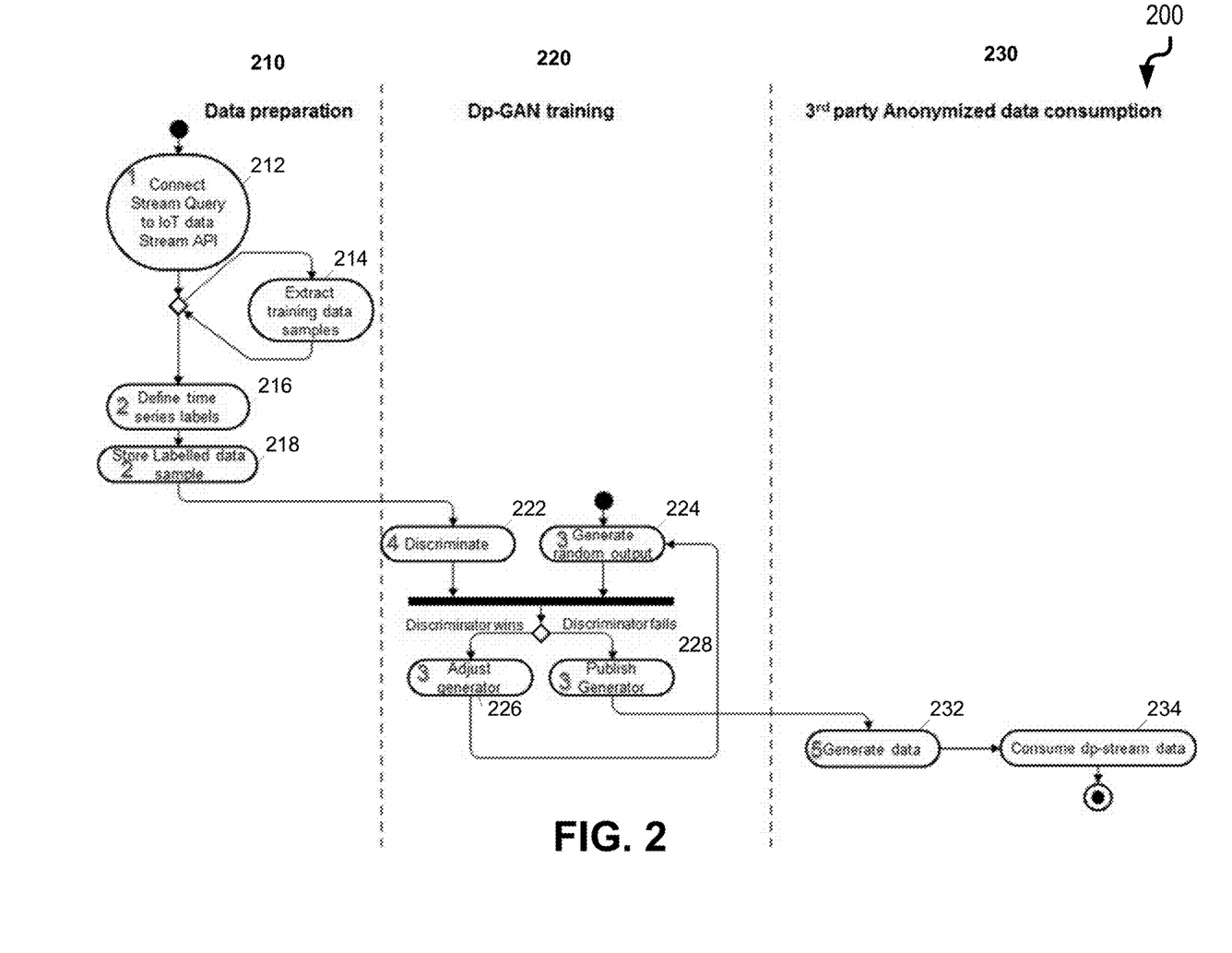
FIG. 2 is an activity diagram for the invention with the different phases

FIG. 2 is a process flow diagram 200 illustrating a process having three phases: a data preparation phase 210, a model training phase 220, and anonymized data consumption phase 230. The reference numbers 1-5 in this diagram 200 indicate operations that can be performed by the components having the same references in diagram 100 of FIG. 1. Initially, at 212, a stream query is connected to the IoT data stream API. From this information, at 214, training data samples can be extracted. Next, at 216, time series labels are defined and, at 218, stored.

The labeled data is then input, at 222, into a discriminator. The model generator can be adjusted if the discriminator wins 226 with a feedback loop causing, at 224, a random output to be generated and input into the discriminator. If the discriminator fails, at 220, the generator can be published 220 so that anonymized data can be generated, at 232, and, at 234, consumed by a third party in the form of stream data. In the dp-GAN training phase, the dp-GAN training loop can be managed by the neural network normal stochastic decent process. The generator in this regard can adjust the weights based on the calculated loss from the previous iteration.

The current subject matter was applied on real data set from a water distribution networks from the City of Antibes in France. In this case, diverse sensors (e.g., pressure, flow, water quality, temperature) measuring different indicators are distributed in several nodes (usually in most populated neighborhoods in the city).

City of Antibes has the obligation to release collected data on the utility infrastructure as OpenData. Nevertheless, while being compliant with national regulations, City of Antibes must preserve privacy on that information. The objective is therefore to hide individual events, for instance, maintenance interventions or anomalies in the water pipeline network, but still to disclose overall data consumption information.

The dataset comprises one month of measurements for 2000 sensors. During the data preparation phase, the dataset samples were labelled in 31 different time series and the corresponding day of the week.

Figure 3:
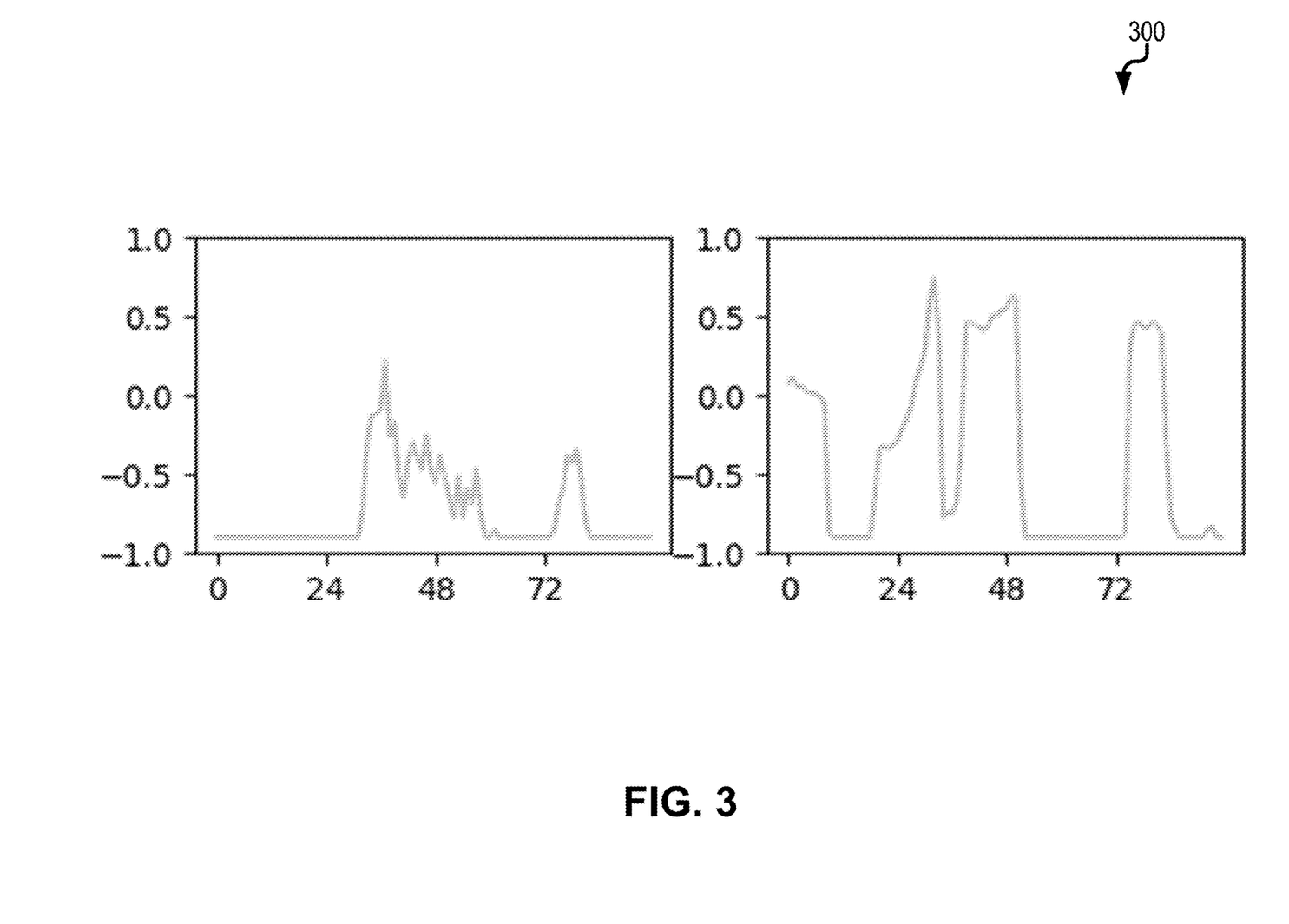
FIG. 3 is a diagram illustrating raw data from a sensor.

FIG. 3 is a diagram 300 that illustrates a raw data sample shows a sample of the data where it is observed that the highest values appear around midday.

Figure 4:
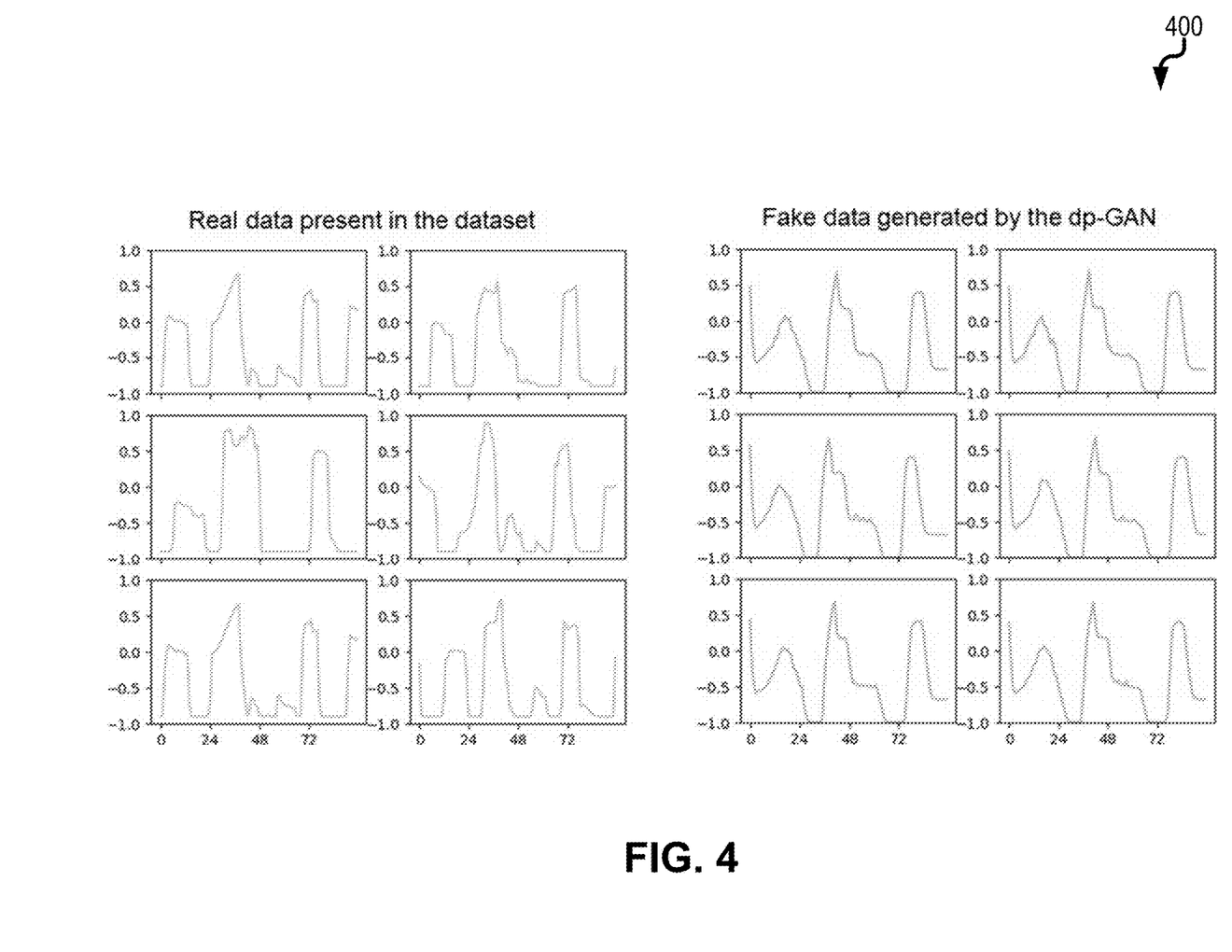
FIG. 4 is a diagram illustrating differentially private output for individual sensors.

The current techniques were applied in the two modes mentioned before, modelling a single sensor, obtaining for instance results as shown in diagram 400 of FIG. 4. An untrusted party will not have access to exact measurements for a given date and time specifically, but to an average value (with some uncertainty added by the noise) for the behavior of sensor 3 on Saturdays, or for Sensor 4 on Fridays. Unusual values appearing as outliers in the time series would be hidden. Indeed, if on a certain day an unexpected peak appears, this peak will be removed in the output data protecting the privacy of the causal event.

Figure 5:
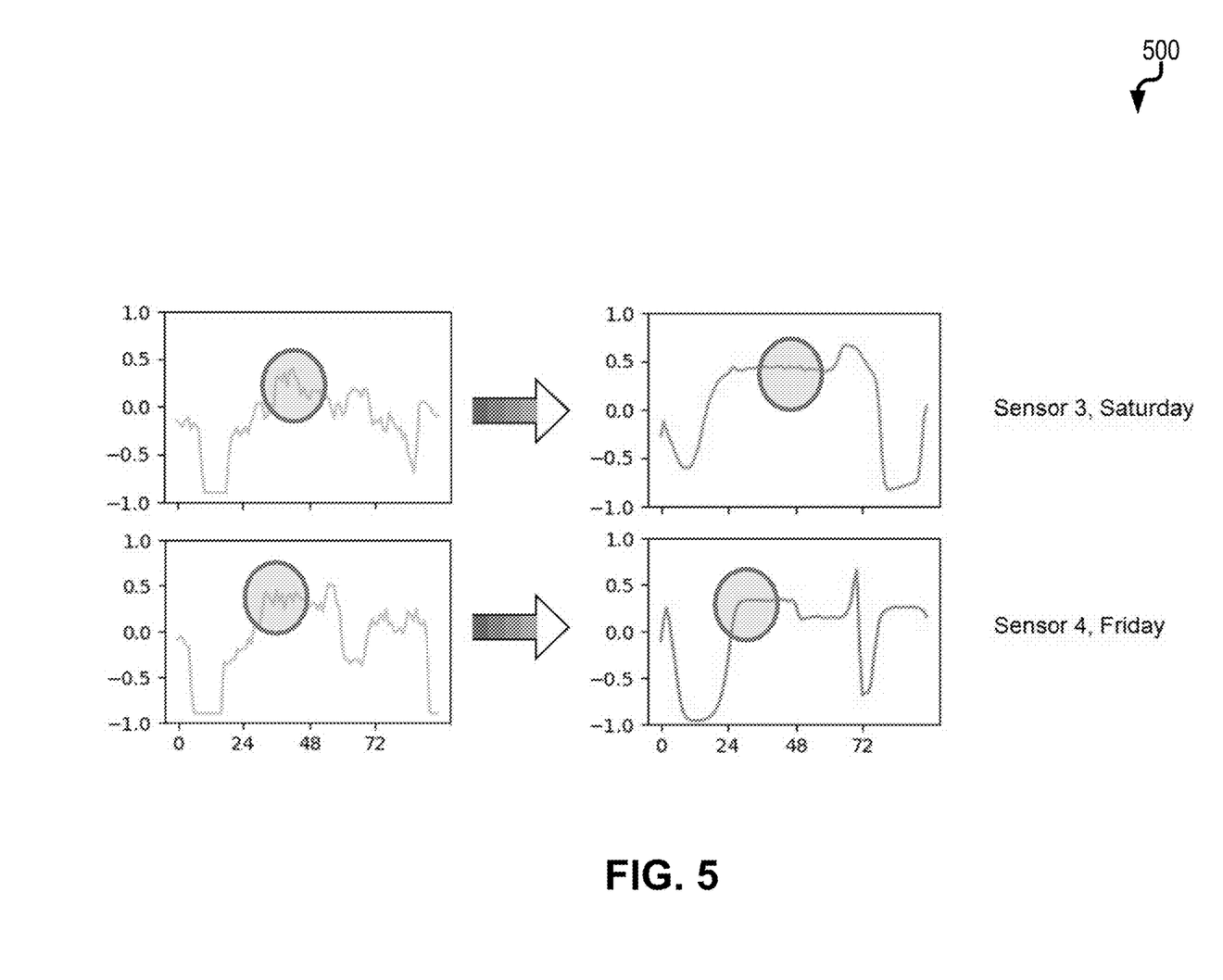
FIG. 5 is a diagram illustrating a differentially private output for multiple sensors.

FIG. 5 is a diagram 500 that illustrates obtained results for a set involving multiple sensors. Here, a third party would not be able to distinguish the measurements for a single sensor for a given type of device. However, the data provides some information regarding the probability distribution of the values across all sensors, with a level of uncertainty introduced by the differential privacy mechanism. This data is still relevant for its utility for providing public information about the water consumption in the whole city thereby enabling public administration transparency.

Figure 6:
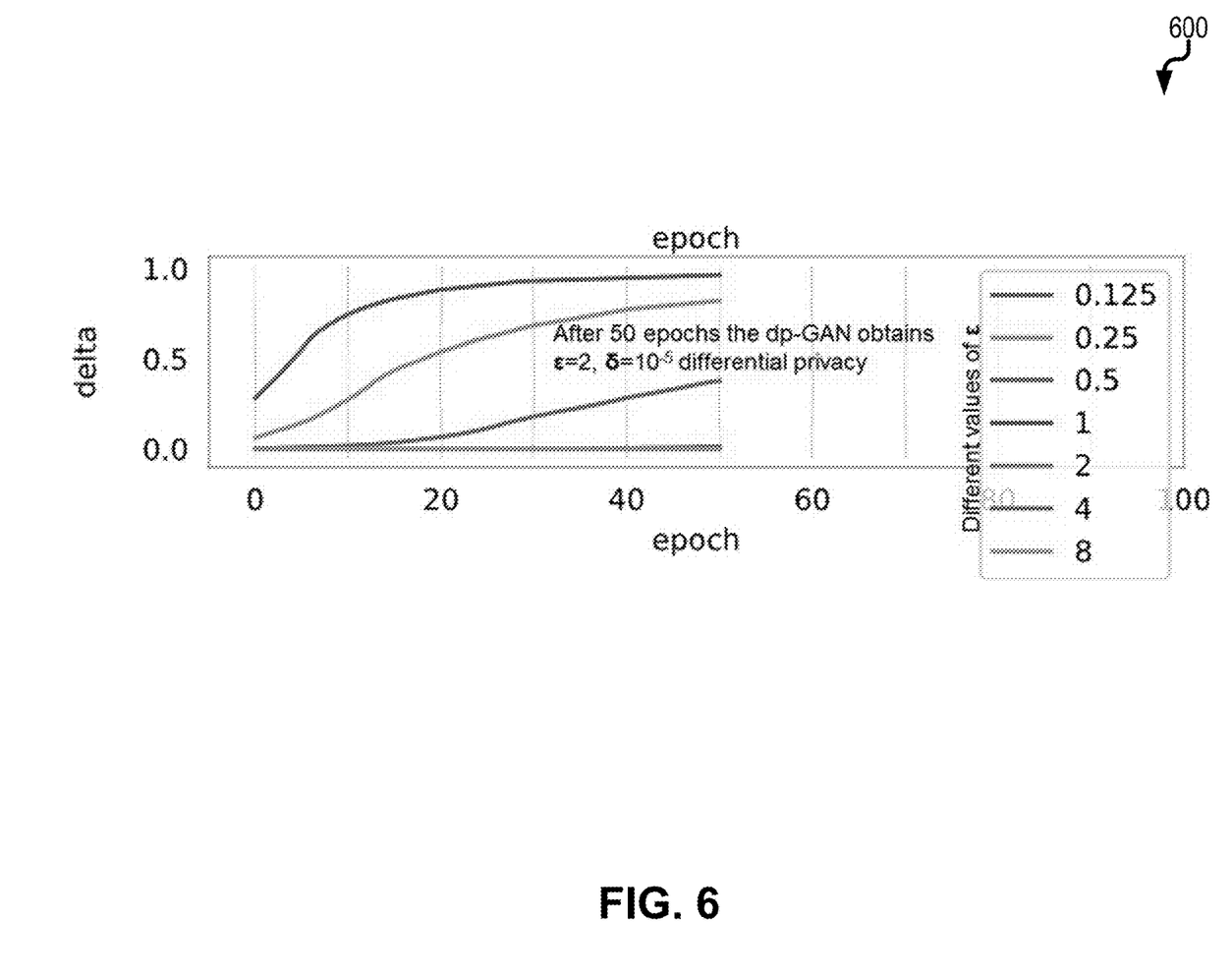
FIG. 6 is a first diagram illustrating performance of the IoT data in relation to guaranteeing privacy.

FIG. 6 is a diagram 600 that illustrates the number of epochs take to converge in the case of the Antibes IoT data anonymization. Here a value was used that was sufficiently small for the parameters $\varepsilon=2$ and $\delta=10^{-5}$, guaranteeing strong privacy when compared to industrial applications of differential privacy nowadays.

A visual assessment of the results has always been a typical method to measure the quality of the generated data from GANs. However, other metrics can provide a more accurate estimation of the performances. Two of the most significant metrics in this field are the Data Time Warping distance and the Wasserstein distance. The first tries to overlap through a non-linear transformation the generated data and the original data and return their distance. On the contrary the second, also known as Earth Mover's Distance, computes the distance between the probability distribution of the original data and the generated data.

Figure 7:
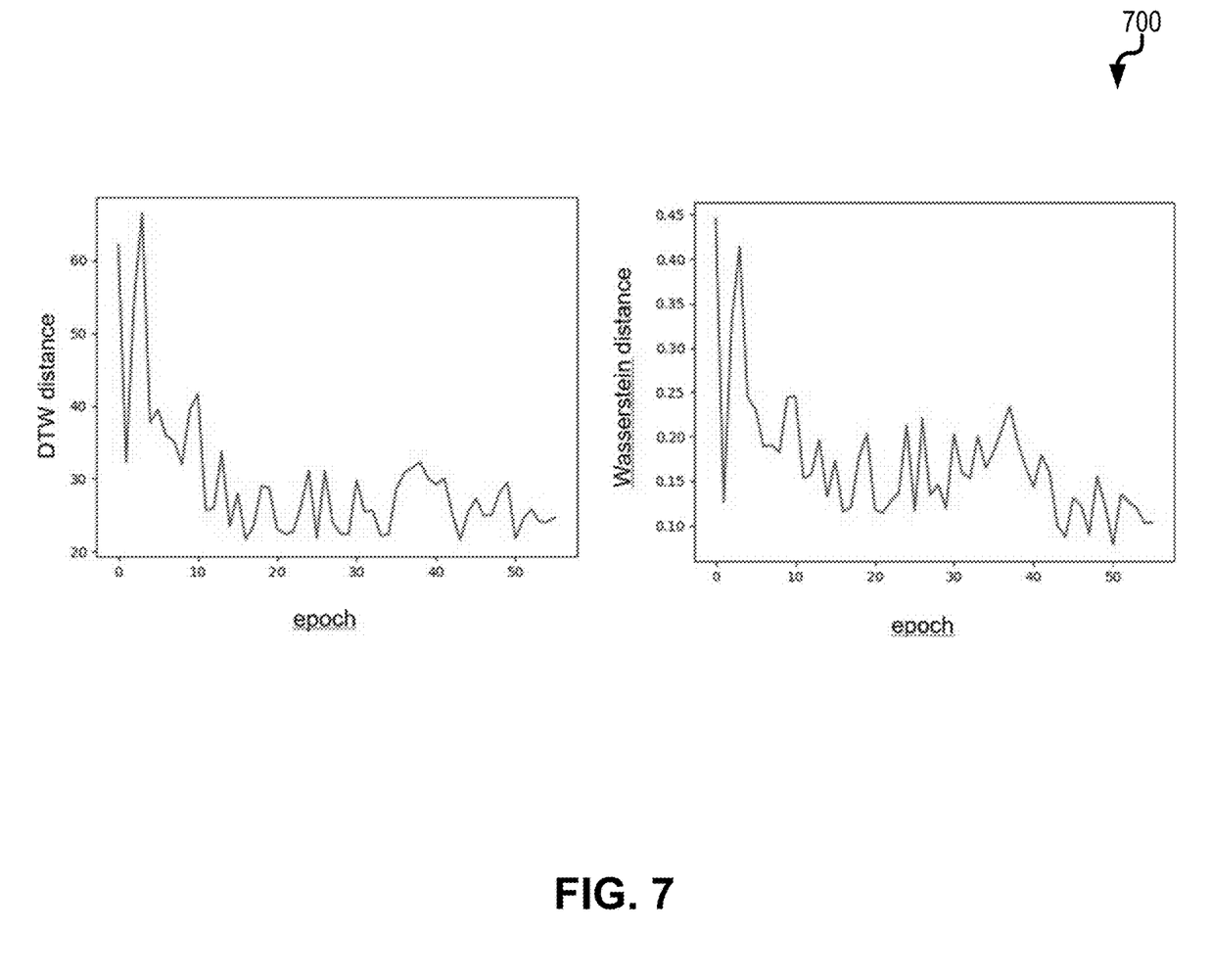
FIG. 7 is a second diagram illustrating performance of the IoT data in relation to guaranteeing privacy.

FIG. 7 is a diagram 700 that illustrates a significant reduction of the two metrics over the time. An optimal value is reached after 50 epochs and only little improvements can be seen after; however, these small improvements do not balance the increase of the costs related to privacy. In this case, the introduced privacy does not allow for optimal results.

Figure 8:
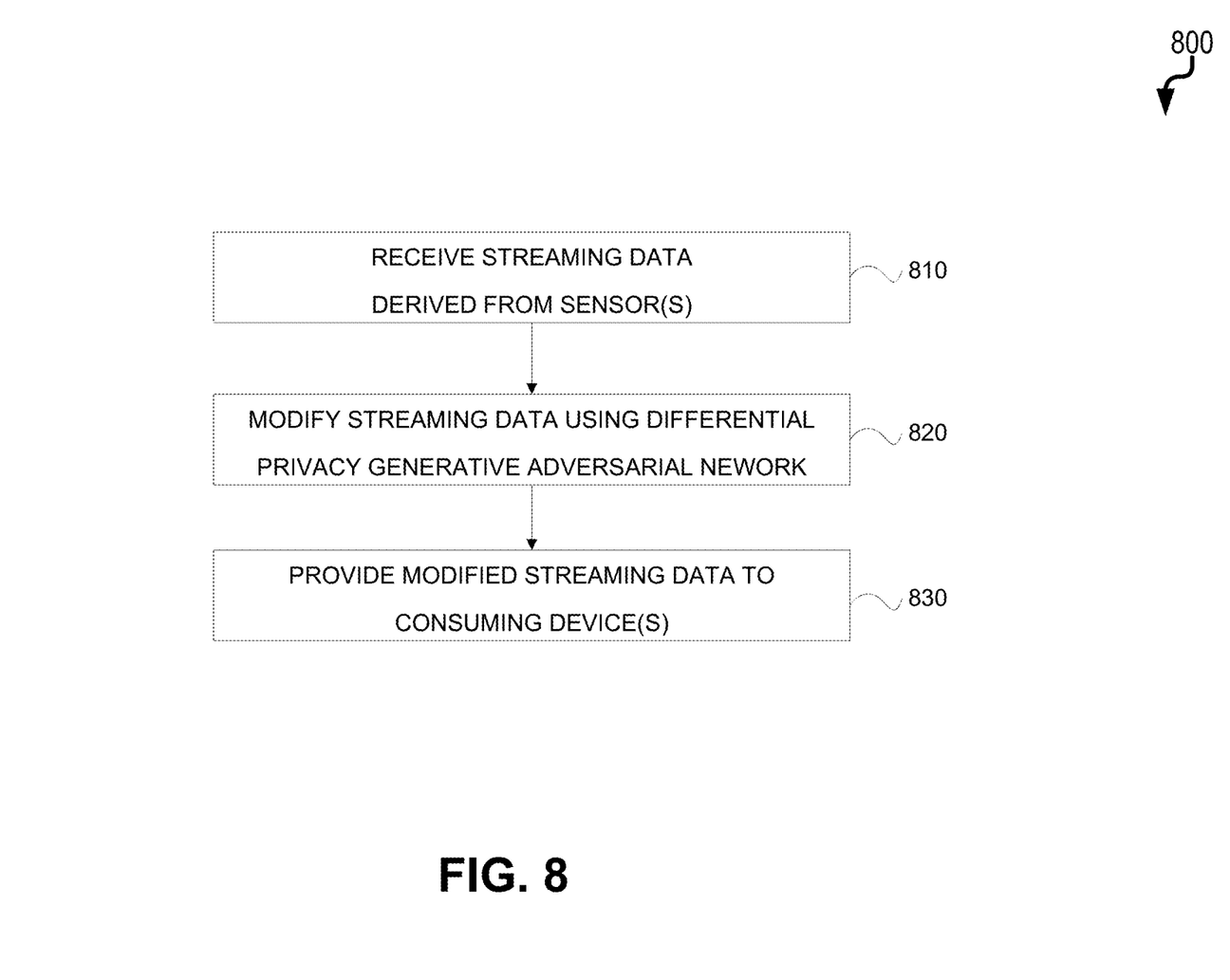
FIG. 8 is a process flow diagram illustrating differential privacy processing of IoT streaming data using generative adversarial networks.

FIG. 8 is a process flow diagram 800 for providing differential privacy processing of IoT streaming data using generative adversarial networks. Initially, at 810, streaming data is received that is derived from at least one sensor. Thereafter, at 820 the streaming data is modified using a differential privacy algorithm such as a trained generative adversarial network (dp-GAN) to result in anonymized data. Once such modification is complete, at 830, the modified streaming data can be provided to at least one consuming computing device.

Figure 9:
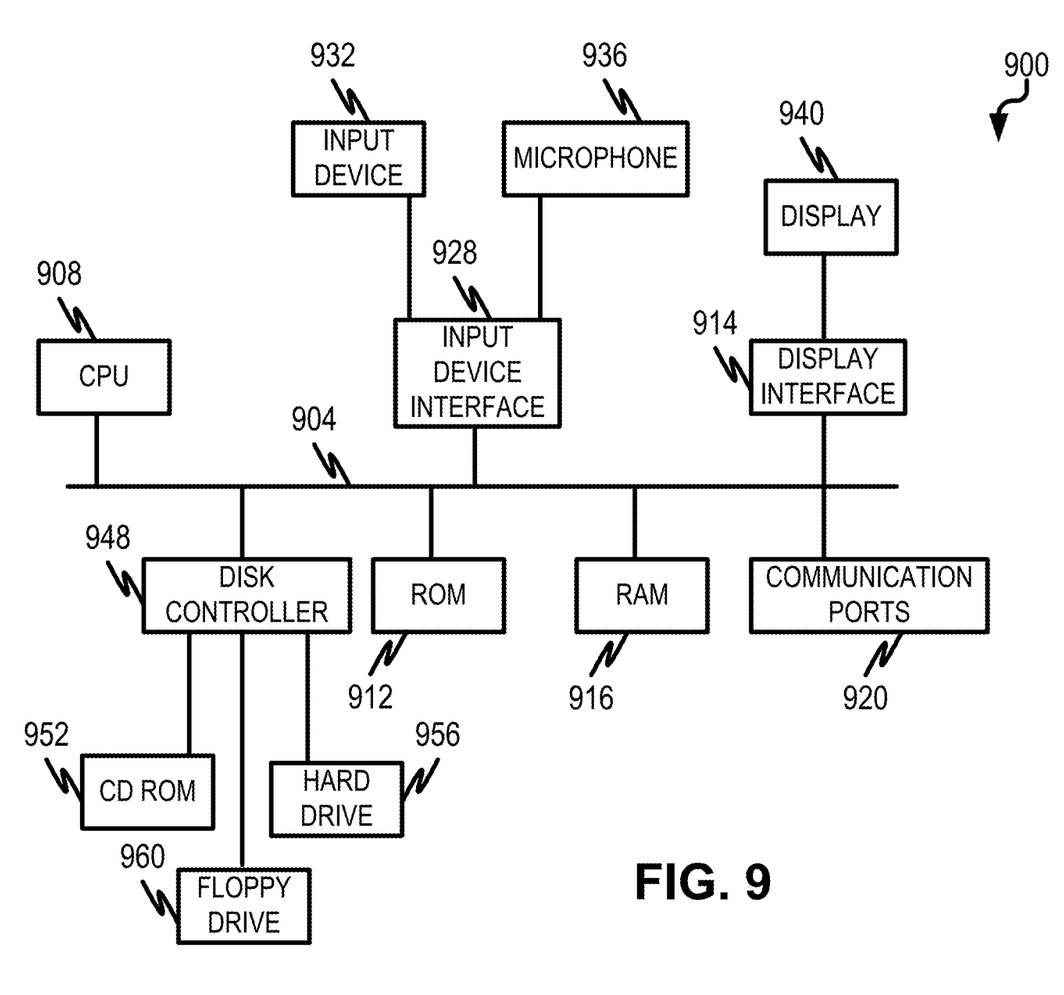
FIG. 9 is a diagram illustrating a computing device for implementing aspects of the current subject matter.

FIG. 9 is a diagram 900 illustrating a sample computing device architecture for implementing various aspects described herein. A bus 904 can serve as the information highway interconnecting the other illustrated components of the hardware. A processing system 908 labeled CPU (central processing unit) (e.g., one or more computer processors/data processors at a given computer or at multiple computers), can perform calculations and logic operations required to execute a program. A non-transitory processor-readable storage medium, such as read only memory (ROM) 912 and random access memory (RAM) 916, can be in communication with the processing system 908 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 948 can interface with one or more optional disk drives to the system bus 904. These disk drives can be external or internal floppy disk drives such as 960, external or internal CD-ROM, CD-R, CD-RW or DVD, or solid state drives such as 952, or external or internal hard drives 956. As indicated previously, these various disk drives 952, 956, 960 and disk controllers are optional devices. The system bus 904 can also include at least one communication port 920 to allow for communication with external devices either physically connected to the computing system or available externally through a wired or wireless network. In some cases, the at least one communication port 920 includes or otherwise comprises a network interface.

To provide for interaction with a user, the subject matter described herein can be implemented on a computing device having a display device 940 (e.g., a CRT (cathode ray tube) or LCD (liquid crystal display) monitor) for displaying information obtained from the bus 904 via a display interface 914 to the user and an input device 932 such as keyboard and/or a pointing device (e.g., a mouse or a trackball) and/or a touchscreen by which the user can provide input to the computer. Other kinds of input devices 932 can be used to provide for interaction with a user as well; for example, feedback provided to the user can be any form of sensory feedback (e.g., visual feedback, auditory feedback by way of a microphone 936, or tactile feedback); and input from the user can be received in any form, including acoustic, speech, or tactile input. The input device 932 and the microphone 936 can be coupled to and convey information via the bus 904 by way of an input device interface 928. Other computing devices, such as dedicated servers, can omit one or more of the display 940 and display interface 914, the input device 932, the microphone 936, and input device interface 928.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device, the method comprising:
    receiving streaming data derived from at least one sensor;
    training at least one differential privacy algorithm using a deep learning model,
        wherein the training comprises modifying at least one of a plurality of gradients of the deep learning model with at least one noise;
    modifying the streaming data using the at least one differential privacy algorithm that anonymizes the received streaming data; and
    providing the modified streaming data to at least one consuming computing device.

2. The method of claim 1, wherein the at least one differential privacy algorithm comprises a differential privacy generative adversarial network (dp-GAN).

3. The method of claim 1, wherein the at least one differential privacy algorithm utilizes a generator to generate new data samples by mapping random noise into new data instances while capturing an original data distribution.

4. The method of claim 3, wherein the at least one differential privacy algorithm utilizes a discriminator that attempts to distinguish the generated new data samples from real data samples.

5. The method of claim 4, wherein the discriminator further estimates a probability that a particular data sample comes from the training data set rather than the generated new data samples generated by the generator.

6. The method of claim 1, wherein the modified streaming data characterizes events occurring in multiple sensors.

7. The method of claim 6, wherein the modified streaming data obfuscates which of the multiple sensors generates any particular event.

8. The method of claim 1 further comprising:
    receiving user-generated input specifying a constraint, wherein the constraint is used to define how data can be transferred and shared between data sources without compromising privacy and, at the same time, while limiting data loss.

9. A system comprising:
    at least one data processor;
    memory storing instructions which, when executed by the at least one data processor, results in operations comprising:
        receiving streaming data derived from at least one sensor;
        training at least one differential privacy algorithm using a deep learning model,
            wherein the training comprises modifying at least one of a plurality of gradients of the deep learning model with at least one noise;
        modifying the streaming data using the at least one differential privacy algorithm that anonymizes the received streaming data; and
        providing the modified streaming data to at least one consuming computing device.

10. The system of claim 9, wherein the at least one differential privacy algorithm comprises a differential privacy generative adversarial network (dp-GAN).

11. The system of claim 9, wherein the at least one differential privacy algorithm utilizes a generator to generate new data samples by mapping random noise into new data instances while capturing an original data distribution.

12. The system of claim 11, wherein the at least one differential privacy algorithm utilizes a discriminator that attempts to distinguish the generated new data samples from real data samples.

13. The system of claim 12, wherein the discriminator further estimates a probability that a particular data sample comes from the training data set rather than the generated new data samples.

14. The system of claim 9, wherein the modified streaming data characterizes events occurring in multiple sensors.

15. The system of claim 14, wherein the modified streaming data obfuscates which of the multiple sensors generates any particular event.

16. The system of claim 9, wherein the operations further comprise:
    receiving user-generated input specifying a constraint, wherein the constraint is used to define how data can be transferred and shared between data sources without compromising privacy and, at the same time, while limiting data loss.

17. A non-transitory computer program product storing instructions which, when executed by at least one data processor forming part of at least one computing device, results in operations comprising:
    receiving streaming data derived from at least one Internet of Things (IoT) sensor;
    training at least one differential privacy algorithm within a deep learning model,
        wherein the training comprises modifying at least one of a plurality of gradients of the deep learning model with at least one noise;
    modifying the streaming data using at least one differential privacy algorithm that anonymizes the received streaming data; and
    providing the modified streaming data to at least one consuming computing device.

18. The computer program product of claim 17, wherein the at least one differential privacy algorithm comprises a differential privacy generative adversarial network (dp-GAN), the dp-GAN utilizes a generator to generate new data samples by mapping random noise into new data instances while capturing an original data distribution, the dp-GAN utilizes a discriminator that attempts to distinguish the generated new data samples from real data samples, the discriminator further estimates a probability that a particular data sample comes from a training data set rather than generated new data samples.

19. The computer program product of claim 18, wherein the modified streaming data characterizes events occurring in multiple sensors.

20. The computer program product of claim 19, wherein the modified streaming data obfuscates which of the multiple sensors generates any particular event.

* * * * *